(12) United States Patent
Ren et al.

(10) Patent No.: US 11,171,518 B2
(45) Date of Patent: *Nov. 9, 2021

(54) WIRELESS POWER SYSTEM WITH RECONFIGURABLE RECTIFIER CIRCUITRY

(71) Applicant: Apple Inc., Cupertino, CA (US)

(72) Inventors: Saining Ren, Auckland (NZ); Ho Fai Leung, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,942

(22) Filed: Feb. 15, 2021

(65) Prior Publication Data
US 2021/0184502 A1    Jun. 17, 2021

Related U.S. Application Data

(63) Continuation of application No. 16/505,370, filed on Jul. 8, 2019, now Pat. No. 10,923,959.
(Continued)

(51) Int. Cl.
*H02J 50/12*    (2016.01)
*H02J 50/80*    (2016.01)
(Continued)

(52) U.S. Cl.
CPC ............. *H02J 50/12* (2016.02); *H02J 5/005* (2013.01); *H02J 7/025* (2013.01); *H02J 50/80* (2016.02); *H04B 5/0037* (2013.01)

(58) Field of Classification Search
CPC .. H02J 5/005; H02J 50/10; H02J 50/12; H02J 50/80; H02J 7/025; H04B 5/0037
(Continued)

(56) References Cited

U.S. PATENT DOCUMENTS

| | | | |
|---|---|---|---|
| 9,343,929 | B2 | 5/2016 | Sankar et al. |
| 9,561,730 | B2 | 2/2017 | Widmer et al. |

(Continued)

FOREIGN PATENT DOCUMENTS

| | | |
|---|---|---|
| CN | 104143861 A | 11/2014 |
| CN | 108141047 A | 6/2018 |

(Continued)

*Primary Examiner* — William Hernandez
(74) *Attorney, Agent, or Firm* — Treyz Law Group, P.C.; Jason Tsai

(57) ABSTRACT

A wireless power system has a wireless power transmitting device and a wireless power receiving device. The wireless power transmitting device may be a wireless charging mat or other device with coils for transmitting wireless power signals. The wireless power receiving device may be a cellular telephone or other device with coils for receiving the transmitted wireless power signals. The wireless power receiving device has adjustable rectifier circuitry coupled to a pair of coils. The pair of coils is coupled in series at a node. A transistor is coupled between ground and the node and is controlled by control circuitry. The state of the transistor can be changed to place the adjustable rectifier circuitry in either a first mode of operation in which the adjustable rectifier circuitry forms a full-bridge rectifier or a second mode of operation in which the adjustable rectifier circuitry forms a pair of parallel half-bridge rectifiers.

19 Claims, 4 Drawing Sheets

Related U.S. Application Data

(60) Provisional application No. 62/828,933, filed on Apr. 3, 2019.

(51) Int. Cl.
  *H04B 5/00* (2006.01)
  *H02J 7/02* (2016.01)
  *H02J 5/00* (2016.01)

(58) Field of Classification Search
  USPC .......................................................... 307/104
  See application file for complete search history.

(56) References Cited

U.S. PATENT DOCUMENTS

| | | |
|---|---|---|
| 9,787,197 B2 | 10/2017 | Nakahor |
| 9,948,112 B2 | 4/2018 | Hao et al. |
| 9,985,443 B2 | 5/2018 | Walley et al. |
| 10,038,339 B2 | 7/2018 | Sankar |
| 10,044,228 B2 | 8/2018 | Sankar |
| 10,046,659 B2* | 8/2018 | Bucher .................... H02J 50/12 |
| 10,199,877 B2 | 2/2019 | Van Den Brink et al. |
| 2011/0285349 A1 | 11/2011 | Widmer et al. |
| 2015/0304877 A1 | 10/2015 | Xiao et al. |
| 2017/0141585 A1* | 5/2017 | Walley .................... H02J 50/12 |
| 2018/0013310 A1 | 1/2018 | Moussaoui et al. |
| 2018/0062445 A1 | 3/2018 | Hwang et al. |
| 2018/0131242 A1 | 5/2018 | Louis |
| 2018/0358844 A1 | 12/2018 | Yu et al. |
| 2019/0074721 A1 | 3/2019 | Cheng et al. |
| 2019/0379239 A1* | 12/2019 | Rozgic .................... H02M 1/10 |

FOREIGN PATENT DOCUMENTS

| | | |
|---|---|---|
| CN | 207691541 U | 8/2018 |
| CN | 109417309 A | 3/2019 |
| CN | 109546724 A | 3/2019 |
| DE | 102014012703 A1 | 3/2016 |
| EP | 3229360 B1 | 6/2019 |

* cited by examiner

WIRELESS POWER SYSTEM WITH RECONFIGURABLE RECTIFIER CIRCUITRY

This application is a continuation of patent application Ser. No. 16/505,370, filed Jul. 8, 2019, which claims benefit of provisional patent application No. 62/828,933, filed Apr. 3, 2019, both of which are hereby incorporated by reference herein in their entireties.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The portable electronic device has a coil and rectifier circuitry. The coil of the portable electronic device receives alternating-current wireless power signals from the wireless charging mat. The rectifier circuitry converts the received signals into direct-current power.

SUMMARY

A wireless power system has a wireless power transmitting device and a wireless power receiving device. The wireless power transmitting device is a wireless charging mat or other device with coils for transmitting wireless power signals. The wireless power receiving device is a cellular telephone or other device with coils for receiving the transmitted wireless power signals.

To enhance wireless power transmission efficiency in a variety of operating scenarios, the wireless power receiving device may configure the coils in the wireless power receiving device to receive magnetic flux that is transmitted from the wireless power transmitting device in a first orientation (e.g., horizontal flux) or a second orientation (e.g., vertical flux).

The wireless power receiving device has adjustable rectifier circuitry coupled to a pair of coils. When receiving wireless power, a first of the coils can produce alternating-current signals that are in phase or that are out of phase (e.g., 180° out of phase) with respect to a second of the coils depending on the orientation of the transmitted magnetic flux. The adjustable rectifier circuitry is dynamically reconfigured to accommodate these different scenarios.

The first and second coils are coupled in series at a node. A transistor is coupled between ground and the node. The transistor is controlled by control circuitry. The state of the transistor can be changed to place the adjustable rectifier circuitry in either a first mode of operation in which the adjustable rectifier circuitry forms a full-bridge rectifier or a second mode of operation in which the adjustable rectifier circuitry forms a pair of parallel half-bridge rectifiers.

DETAILED DESCRIPTION

A wireless power system includes a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

The wireless power transmitting device communicates with the wireless power receiving device and obtains information on the characteristics of the wireless power receiving device. In some embodiments, the wireless power transmitting device has multiple power transmitting coils. In such embodiments, the wireless power transmitting device uses information from the wireless power receiving device and/or measurements made in the wireless power transmitting device to determine which coil or coils in the transmitting device are magnetically coupled to wireless power receiving devices. Coil selection is then performed in the wireless power transmitting device.

Wireless power is transmitted from the wireless power transmitting device to the wireless power receiving device using selected coil(s) to charge a battery in the wireless power receiving device and/or to power other load circuitry. The wireless power receiving device has reconfigurable coils. For example, the wireless power receiving device may have a pair of coils coupled to adjustable rectifier circuitry. The rectifier circuitry can be operated in different modes to enhance wireless power reception by the coils.

Figure 1:
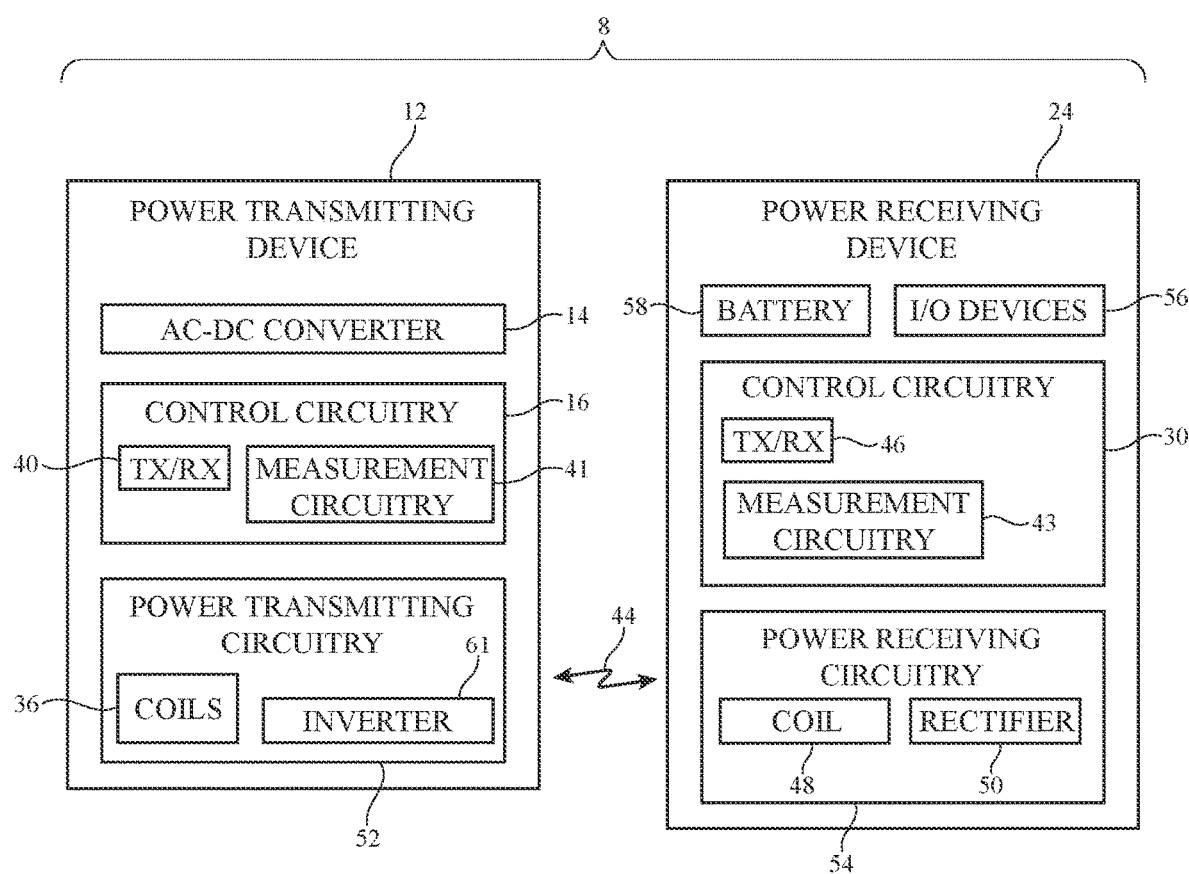
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat are sometimes described herein as an example.

Power receiving device 24 may be a portable electronic device such as a wristwatch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coils 36. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 may have only a single coil. In other arrangements, a wireless charging device such as a wireless charging mat may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. In an illustrative configuration, which may sometimes be described herein as an example, device 24 has a pair of coils 48. When the alternating-current electromagnetic fields are received by coils 48, corresponding alternating-current currents are induced in coils 48. Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56 such as a display, touch sensor, communications circuits, audio components, sensors, light-emitting diode status indicators, other light-emitting and light detecting components, and other components and these components (which form a load for device 24) may be powered by the DC voltages produced by rectifier circuitry 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

It is desirable for power transmitting device 12 and power receiving device 24 to be able to communicate information such as received power, states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects on the charging surface of device 12 (e.g., on the top of a charging mat or, if desired, to detect objects adjacent to the coupling surface of a charging puck). Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator that can create impulses so that impulse responses can be measured to gather inductance information, Q-factor information, etc.) and signal detection circuitry (e.g., filters, analog-to-digital converters, impulse response measurement circuits, etc.). During measurement operations, switching circuitry in device 12 may be adjusted by control circuitry 16 to switch each of coils 36 into use. As each coil 36 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements. Based on this information or other information, control circuitry 30 can configure rectifier circuitry 50 to help enhance wireless power reception by coils 48. For example, rectifier circuitry 50 can be configured to operate in a vertical field mode in scenarios in which transmitted magnetic fields from device 12 are predominantly vertical (e.g., when the coils 36 that are overlapped by coils 48 are driven in phase) and can be configured to operate in a horizontal field mode in scenarios in which transmitted magnetic fields from device 12 are predominantly horizontal (e.g., when the coils 36 that are overlapped by coils 48 are driven out of phase).

Figure 2:
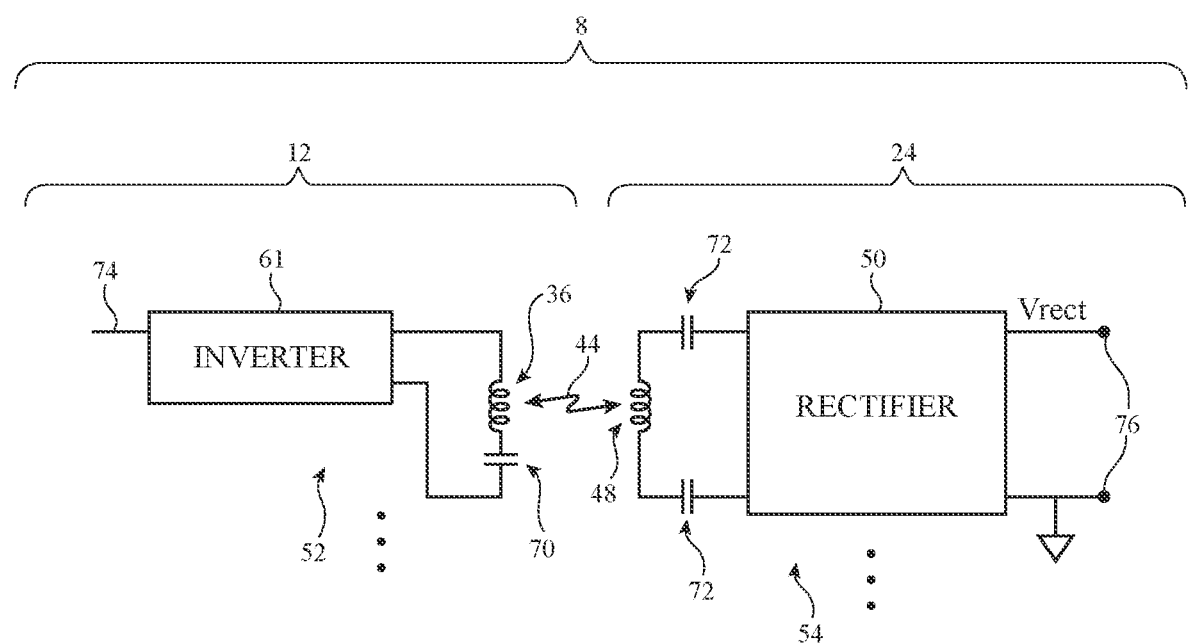
FIG. 2 is a circuit diagram of wireless power transmitting and receiving circuitry in accordance with an embodiment.

FIG. 2 is a circuit diagram of illustrative wireless charging circuitry for system 8. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 70. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. This causes the output circuit formed from selected coil 36 and capacitor 70 to produce alternating-current electromagnetic fields (signals 44) that are received by wireless power receiving circuitry 54 using a wireless power receiving circuit formed from one or more coils 48 and one or more capacitors 72 in device 24. If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 24. Rectifier circuitry 50 is coupled to one or more coils 48 (e.g., a pair of coils) and converts received power from AC to DC and supplies a corresponding direct current output voltage Vrect across rectifier output terminals 76 for powering load circuitry in device 24 (e.g., for charging battery 58, for powering a display and/or other input-output devices 56, and/or for powering other components). A single coil 48 or multiple coils 48 may be included in device 24. In an illustrative configuration, device 24 may be a cellular telephone or other portable device with a pair of coils 48. Other configurations may be used, if desired.

Figure 3:
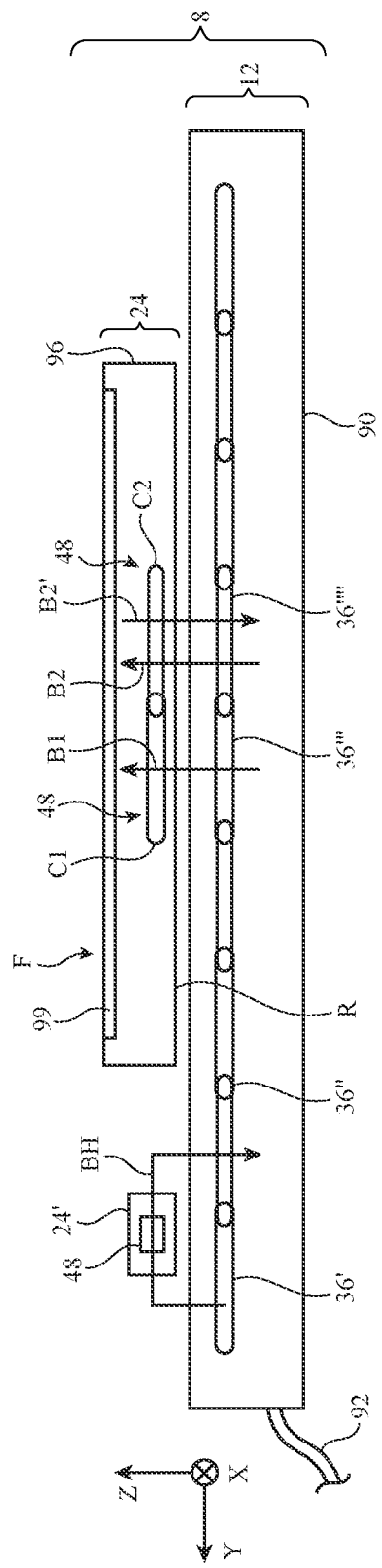
FIG. 3 is a side view of an illustrative wireless power transmitting device such as a wireless charging pad and a corresponding wireless power receiving device such as a cellular telephone with multiple wireless power receiving coils in accordance with an embodiment.

FIG. 3 is a cross-sectional side view of system 8 in an illustrative configuration in which wireless power transmitting device 12 is a wireless charging mat and in which wireless power receiving device 24 is a cellular telephone (as an example). Device 12 has housing 90 (e.g., a mat housing formed form polymer, other dielectric material, and/or other materials). Cable 92 may be coupled to housing 90 and may provide power to device 12. In some configurations, power may be provided by an internal battery.

Device 24 may have a housing such as housing 96. Housing 96 and device 24 may have opposing front and rear faces such as front face F and rear face R. Display 99 may be formed on front face F of housing 96 and device 24 and may lie in a plane that is perpendicular to the Z axis (e.g., a plane such as the X-Y plane of FIG. 3 that is parallel to the planes including front face F and rear face R of housing 96).

The coils in devices 12 and/or 24 may have any suitable number of turns of wire. In some configurations, the coils may be formed from turns of wire wrapped around cores made of iron, ferrite, or other magnetic material.

During wireless power transmission, device 12 may use one or more coils 36 to transmit wireless power signals. For example, coils 48 of device 24 may overlap a pair of coils in device 12 such as coils 36''' and 36''''. Coils 36''' and 36'''' may be coupled to respective inverters 61. During operation, control circuitry 16 may direct these respective inverters to drive corresponding coils 36''' and 36'''' in phase (e.g., to produce respective in-phase magnetic fields B1 and B2). The magnetic field produced by device 12 in this type of arrangement may predominantly extend vertically through coils 48 parallel to the vertical Z axis of FIG. 3. Accordingly, operation of device 12 in a configuration in which coils 36''' and 36'''' are driven in phase may sometimes be referred to as operation of device 12 in a vertical field mode. In other arrangements, control circuitry 16 may use the inverters 61 that are coupled to coils 36''' and 36'''' to drive coils 36''' and 36'''' out of phase. The inverter circuitry of device 12 may, as an example, drive coils 36''' and 36'''' 180° out of phase (e.g., to produce respective of-of-phase magnetic fields B1 and B2'). This creates horizontal magnetic fields (e.g., magnetic field lines that extends parallel to the X-Y plane of FIG. 3 and parallel to the charging surface of device 12). Operation of device 12 in this configuration may sometimes be referred to as a horizontal field mode. Some wireless power receiving devices such as illustrative wireless power receiving device 24' may have coil(s) 48 oriented to receive horizontal magnetic fields, (e.g., horizontal field BH produced by driving coils 36' and 36'' 180° out of phase with respect to each other).

As these examples demonstrate, the coils 36 that are selected for use in device 12 and the relative phase of the drive currents that are applied to the selected coils 36 during operation affect the location and orientation of the magnetic fields produce by coils 36. The location and orientation of the magnetic fields produced by coils 36 and the location and orientation of coils 48 relative to these fields can affect wireless power transmission efficiency. With an illustrative arrangement, which is sometimes described herein as an example, device 24 has a pair of coils 48 coupled to adjustable rectifier circuitry 50. In this arrangement, rectifier circuitry 50 may convert received wireless power from a pair of coils (first and second coils 48) to direct-current power.

Rectifier circuitry 50 is adjusted dynamically by control circuitry 16 to help enhance wireless power reception. As an example, control circuitry 16 can configure rectifier circuitry 50 for operation in a vertical field mode appropriate for enhancing wireless power reception from vertical magnetic fields or a horizontal field mode appropriate for enhancing wireless power reception from horizontal magnetic fields. In the vertical field mode, the magnetic fields B1 and B2 received by the first and second coils 48 are generally in phase and rectifier circuitry 50 is configured to convert these in-phase wireless power signals to direct-current power. In the horizontal field mode, the magnetic fields B1 and B2' received by the first and second coils are out-of-phase with respect to each other (e.g., 180° out of phase) and rectifier circuitry 50 is reconfigured to efficiently convert these wireless power signals to direct-current power.

Figure 4:
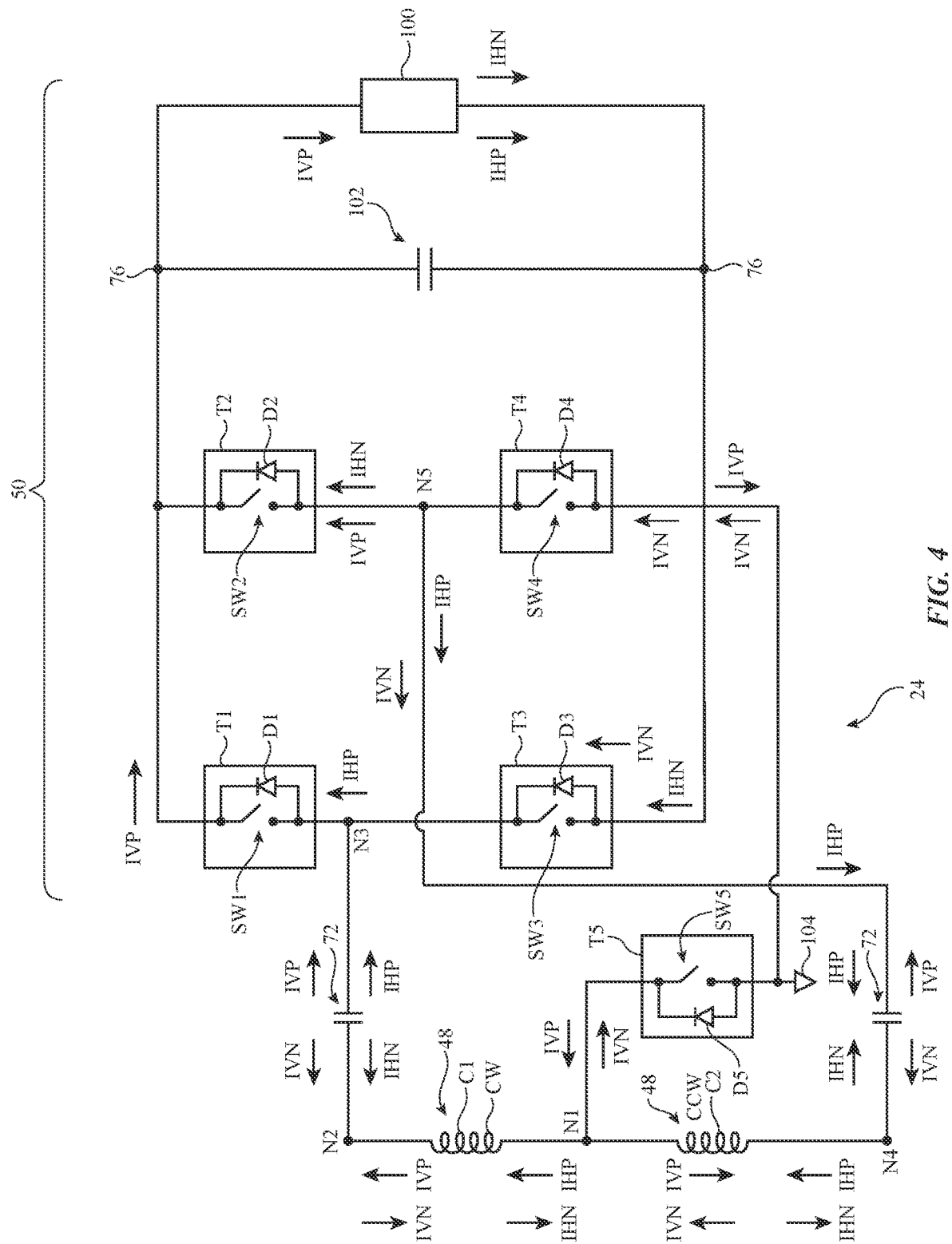
FIG. 4 is a circuit diagram of illustrative adjustable rectifier circuitry in accordance with an embodiment.

FIG. 4 is a circuit diagram of illustrative adjustable circuitry that may be used in forming adjustable rectifier 50 for wireless power receiving device 24. As shown in FIG. 4, wireless power may be received at a pair of coils 48 in device 24 such as first coil C1 and second coil C2. Coils C1 and C2 may, as an example, be mounted in housing 96 of device 24 as shown in FIG. 3. Coils C1 and C2 may have wire turns that are wound in the same sense (e.g., both clockwise or both counterclockwise) or may, as shown in FIG. 4 have opposite winding senses (e.g., coil C1 may be wound clockwise (CW) while coil C2 is wound counterclockwise (CCW)). Capacitors 72 may be interposed between coils 48 and nodes N3 and N5, which serve as inputs (input terminals) for adjustable rectifier circuitry 50. During operation of rectifier circuitry 50, direct-current output voltage Vrect is produced across output terminals 76 to power load 100 (e.g., to power input-output devices 56, to charge battery 58, and to supply power to other circuitry in power receiving device 24). Capacitor 102 may be coupled across terminals 76 in parallel with load 100 to help reduce voltage ripple.

Coils C1 and C2 may be coupled in series between nodes N2 and N4. Coil C1 may have a first terminal coupled to node N2 and a second terminal coupled to node N1. Coil C2 may have a first terminal coupled to node N4 and a second terminal coupled to the second terminal of coil C1 at node N1. Rectifier circuitry 50 may have an array of four rectifier transistors T1, T2, T3, and T4. Transistors T1, T2, T3, and T4 may be passively driven field-effect transistors having body diodes coupled between the source-drain terminals of the transistors (e.g., transistors T1, T2, T3, and T4 may form an array of four respective diodes). If desired, transistors T1, T2, T3, and T4 may be actively driven to perform active rectification. Passively driven schemes are described herein as an example.

Each of transistors T1, T2, T3, and T4 has a body diode having terminals coupled to the source-drain terminals of the transistor. Transistor T1 may have body diode D1 coupled in parallel with transistor switch SW1, which is open. Transistor T2 may have body diode D2 coupled in parallel with transistor switch SW2, which is open. Transistors T3 and T4 may respectively have body diodes D3 and D4 coupled respectively in parallel with transistor switches SW3 and SW4, which are open. In a passively driven scheme, transistors T1, T2, T3, and T4 form an array of four respective diodes D1, D2, D3, and D4 that are used for rectification.

Adjustable rectifier circuitry 50 has transistor T5. Transistor T5 may include a body diode D5 coupled in parallel with transistor switch SW5, which may be controlled by a control signal received at the gate of transistor T5 from control circuitry 30. The source-drain terminals of transistor T5 may be coupled, respectively to node N1 and ground 104. Control circuitry 30 can selectively place rectifier circuitry 50 in a first mode (sometimes referred to as the vertical field mode or vertical mode) in which transistor switch SW5 of transistor T5 is closed) and a second mode (sometimes referred to as the horizontal field mode or horizontal mode) in which transistor switch SW5 of transistor T5 is open).

In the vertical mode, switch SW5 is closed and forms a short circuit between node N1 and ground 104 and diodes D1, D2, D3, and D4 (e.g., transistors T1, T2, T3, and T4) of adjustable rectifier circuitry 50 form two half-bridge rectifiers that are used in parallel. A first half-bridge rectifier is formed from transistors T1 and T2 (diodes D1 and D2) and a second half-bridge rectifier is formed from transistors T3 and T4 (diodes D3 and D4). During operation in the vertical mode, current IVP flows from coils 48 through circuitry 50 during positive cycles of the received AC wireless power signal, thereby powering load 100. During negative cycles of the received AC wireless power signal in the vertical mode, current IVN flows and charges capacitors 72.

In the horizontal mode, transistor T5 has a different state (e.g., switch SW5 is open). When switch SW5 is open, diode D5 is switched into use between node N1 and ground 104. In this mode, transistors T1, T2, T3, and T4 (diodes D1, D2, D3, and D4) of adjustable rectifier circuitry 50 form a full bridge rectifier. During positive cycles, current IHP flows through rectifier circuitry 50 and powers load 100. During negative cycles, current IHN flows through rectifier circuitry 50 and powers load 100.

Accordingly, adjustable rectifier circuitry 50 can be used to receive vertical mode magnetic fields (e.g., coil C1 may receive field B1 of FIG. 3 and coil C2 may receive field B2 of FIG. 3) and, when reconfigured by opening switch SW5, can be used to receive horizontal mode magnetic fields (e.g., coil C1 may receive field B1 of FIG. 3 and coil C2 may receive field B2' of FIG. 3). By allowing control circuitry 30 to control the state of rectifier circuitry 50 (e.g., by controlling the state of switching circuitry such as switch SW5 of transistor T5), control circuitry 30 can adjust coils 48 and rectifier circuitry 50 to handle vertical magnetic fields or horizontal magnetic fields. This allows circuitry 50 to be dynamically adjusted to accommodate changes in the magnetic field received by device 24 due to changes in the wireless power signal transmitted by device 12 and/or placement and orientation changes of devices 12 and 24. The adjustability of rectifier circuitry 50 therefore provides device 24 with enhanced flexibility to pick up both horizontal and vertical magnetic flux. If desired, the incorporation of coils C1 and C2 in device 24 may allow wireless power signals to be transmitted to accessory devices. For example, inverter circuitry in device 24 may be coupled to coils C1 and C2 and can drive these coils to produce out-of-phase magnetic fields (e.g., horizontal magnetic fields) that can be received by wireless earbuds or other power receiving devices that overlap coils 48.

Satisfactory wireless power transfer may be obtained by ensuring satisfactory tuning of the wireless power transfer circuitry in system 8. The total inductance for coils 48 coupled in series is 2L, where L is the inductance of coil C1 and L is the inductance of coil C2. The effective capacitance of capacitors 72 in series is C/2, where C is the capacitance of each capacitor 72. The resonant frequency ffb for full bridge operation (used in horizontal mode) is thus given by equation 1.

$$ffb = 1/[2\pi(2L*C/2)^{1/2}] \qquad (1)$$

This is the same as the resonant frequency fhb for half bridge operation (used in vertical mode) that is given by equation 2.

$$fhb=1/[2\pi(L*C)^{1/2}] \qquad (2)$$

Because ffb and fhb are the same, the tuning of rectifier circuitry 50 does not vary even as control circuitry 30 switches rectifier circuitry 50 between vertical and horizontal modes, thereby helping to ensure that the wireless power receiving circuitry of device 24 will not become detuned when switching between modes.

The foregoing is merely illustrative and various modifications can be made to the described embodiments. The foregoing embodiments may be implemented individually or in any combination.

What is claimed is:

1. A wireless power receiving device comprising:
   a housing having a surface;
   a wireless charging coil configured to receive wireless power signals;
   adjustable rectifier circuitry that is coupled to the wireless charging coil and that is operable in a full-bridge rectifier mode and a half-bridge rectifier mode; and
   control circuitry configured to dynamically adjust the adjustable rectifier circuitry between the full-bridge rectifier mode and the half-bridge rectifier mode, wherein the wireless power signals are characterized by a magnetic flux direction relative to the surface and wherein the control circuitry is configured to dynamically adjust the adjustable rectifier circuitry between the full-bridge rectifier mode and the half-bridge rectifier mode based on changes in the magnetic flux direction relative to the surface.

2. The wireless power receiving device of claim 1, wherein the control circuitry is configured to dynamically adjust the adjustable rectifier circuitry between the full-bridge rectifier mode and the half-bridge rectifier mode based on changes in the wireless power signals received by the wireless charging coil.

3. The wireless power receiving device of claim 2, wherein the adjustable rectifier circuitry is configured to output a rectified voltage based on the wireless power signals received by the wireless charging coil.

4. The wireless power receiving device of claim 1, wherein the wireless power signals are generated from a location relative to the surface and wherein the control circuitry is configured to dynamically adjust the adjustable rectifier circuitry between the full-bridge rectifier mode and the half-bridge rectifier mode based on changes in the location.

5. The wireless power receiving device of claim 1, wherein the wireless power signals are generated by a wireless power transmitting device having a charging surface and wherein the control circuitry is configured to dynamically adjust the adjustable rectifier circuitry between the full-bridge rectifier mode and the half-bridge rectifier mode based on changes in placement of the wireless power receiving device on the charging surface.

6. The wireless power receiving device of claim 1, further comprising:
   a switch having a first terminal coupled to the wireless charging coil and having a second terminal coupled to ground, wherein the switch is controlled by the control circuitry.

7. The wireless power receiving device of claim 6, wherein the control circuitry is configured to deactivate the switch in the full-bridge rectifier mode and to activate the switch in the half-bridge rectifier mode.

8. An accessory comprising:
   a housing having a surface;
   a coil configured to receive wireless power signals;
   adjustable rectifier circuitry that is coupled to the coil and that is operable in a full-bridge rectifier mode and a half-bridge rectifier mode; and
   control circuitry configured to dynamically adjust the adjustable rectifier circuitry between the full-bridge rectifier mode and the half-bridge rectifier mode based on changes in the wireless power signals received by the coil, wherein the wireless power signals are generated from a location relative to the surface and wherein the control circuitry is configured to dynamically adjust the adjustable rectifier circuitry between the full-bridge rectifier mode and the half-bridge rectifier mode based on changes in the location.

9. The accessory of claim 8, wherein the adjustable rectifier circuitry is configured to output a rectified voltage based on the wireless power signals received by the coil.

10. The accessory of claim 8, wherein the control circuitry is configured to communicate with a portable electronic device to pair the accessory with the portable electronic device.

11. The accessory of claim 8, wherein the control circuitry is configured to communicate with a portable electronic device having a display.

12. The accessory of claim 8, further comprising:
    a switch having a first terminal coupled to the coil and having a second terminal coupled to ground, wherein the switch is controlled by the control circuitry.

13. The accessory of claim 12, wherein the control circuitry is configured to open the switch in the full-bridge rectifier mode and to close the switch in the half-bridge rectifier mode.

14. An apparatus comprising:
    a wireless charging coil;
    reconfigurable rectifier circuitry that has four switches, that is coupled to the wireless charging coil, and that is operable in a first rectifier mode and a second rectifier mode;
    an additional switch coupled to the wireless charging coil; and
    control circuitry configured to dynamically adjust the reconfigurable rectifier circuitry between the first and second rectifier modes by controlling the additional switch.

15. The apparatus of claim 14, wherein the reconfigurable rectifier circuitry forms a full-bridge rectifier in the first rectifier mode and forms at least one half-bridge rectifier in the second rectifier mode.

16. The apparatus of claim 14, wherein the reconfigurable rectifier circuitry forms a full-bridge rectifier in the first rectifier mode and forms a non-full-bridge rectifier in the second rectifier mode.

17. The apparatus of claim 14, wherein the control circuitry is configured to turn off the additional switch in the first rectifier mode and to turn on the additional switch in the second rectifier mode.

18. The apparatus of claim 14, wherein the additional switch has a first terminal coupled to the wireless charging coil and has a second terminal coupled to ground.

19. The apparatus of claim 14, wherein the control circuitry is configured to dynamically adjust the reconfigurable rectifier circuitry between the first and second rectifier modes based on changes in wireless power received by the wireless charging coil.

\* \* \* \* \*